(12) United States Patent
Ott et al.

(10) Patent No.: US 8,136,870 B2
(45) Date of Patent: Mar. 20, 2012

(54) COWL BRACES AND WINDSHIELD SUPPORT ASSEMBLIES WITH COWL BRACES

(75) Inventors: Kyle Andrew Ott, Laurel, MD (US); Aaron Richard Steinhilb, Westland, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 157 days.

(21) Appl. No.: 12/565,246

(22) Filed: Sep. 23, 2009

(65) Prior Publication Data

US 2011/0068607 A1   Mar. 24, 2011

(51) Int. Cl.
*B62D 25/08* (2006.01)
(52) U.S. Cl. .................................................. 296/192
(58) Field of Classification Search .............. 296/192, 296/203.02, 193.11, 187.04, 201
See application file for complete search history.

(56) References Cited

U.S. PATENT DOCUMENTS

| | | | |
|---|---|---|---|
| 4,943,102 A | 7/1990 | Hamamoto et al. | |
| 6,193,304 B1 | 2/2001 | Takahashi et al. | |
| 6,193,305 B1 | 2/2001 | Takahashi et al. | |
| 6,565,148 B1* | 5/2003 | Teramoto et al. | 296/192 |
| 6,769,730 B2 | 8/2004 | Okamoto et al. | |
| 6,869,134 B2 | 3/2005 | Kato et al. | |
| 6,921,126 B2 | 7/2005 | Suh et al. | |
| 7,004,534 B2 | 2/2006 | Yoshii et al. | |
| 7,357,446 B2 | 4/2008 | Sakai et al. | |
| 7,540,557 B2 | 6/2009 | Shimura | |
| 7,552,964 B2* | 6/2009 | Saito | 296/192 |
| 7,631,928 B2* | 12/2009 | Ackland et al. | 296/193.11 |
| 7,854,473 B2* | 12/2010 | Kuroita et al. | 296/203.02 |
| 2003/0178873 A1* | 9/2003 | Kato et al. | 296/192 |
| 2006/0087155 A1 | 4/2006 | Koyama et al. | |

* cited by examiner

*Primary Examiner* — Hilary Gutman
(74) *Attorney, Agent, or Firm* — Dinsmore & Shohl (57) ABSTRACT

A windshield support assembly includes a cowl upper that extends in a vehicle widthwise direction and is configured to connect to a windshield, a cowl lower that extends in the vehicle widthwise direction and is configured to connect to the cowl upper, and multiple cowl braces connected to the cowl upper and the cowl lower. The cowl braces are spaced-apart from each other in the vehicle widthwise direction. Each cowl brace includes an upper portion, a lower portion and a continuous body portion connecting the upper portion and the lower portion. At least one of the upper portion and the lower portion includes multiple legs. Each leg is connected to the cowl upper or the cowl lower at spaced-apart locations along the vehicle widthwise direction.

20 Claims, 7 Drawing Sheets

COWL BRACES AND WINDSHIELD SUPPORT ASSEMBLIES WITH COWL BRACES

TECHNICAL FIELD

The present specification generally relates to windshield support assemblies for vehicles and, more specifically, cowl braces for supporting a cowl upper and a cowl lower of a windshield support assembly.

BACKGROUND

Windshield assemblies for vehicles are typically operable to support a windshield as it encounters a variety of forces. For example, windshield assemblies should be sufficiently rigid to resist external forces experienced in everyday operation (e.g. wind) that produce noise and/or vibrations. Windshields are therefore often supported by windshield assemblies that include a cowl upper and a cowl lower with a cowl brace connected there between to provide rigid support. However, when an object outside the vehicle (such as a pedestrian) strikes and impacts the exterior of the windshield, the cowl brace in the windshield support assembly may influence the acceleration of the object—or how quickly the object comes to a stop. Accordingly, a need exists for alternative cowl braces for windshield assemblies that reduce excess noise and vibration while allowing for a decrease in the acceleration of impacting objects.

SUMMARY

In one embodiment, a cowl brace for supporting a cowl upper and a cowl lower of a windshield assembly is disclosed. The cowl brace includes an upper portion comprising a plurality of upper legs extending in an upper direction, the plurality of upper legs being spaced-apart from each other in a vehicle widthwise direction for connection to the cowl upper, a lower portion extending in a lower direction for connection to the cowl lower, and a continuous body portion extending in the vehicle widthwise direction connecting the upper portion and the lower portion.

In another embodiment, a windshield support assembly includes a cowl upper that extends in a vehicle widthwise direction and is configured to connect to a windshield, a cowl lower that extends in the vehicle widthwise direction and is configured to connect to the cowl upper, and a cowl brace that comprises an upper portion, a lower portion and a continuous body portion connecting the upper portion and the lower portion wherein at least one of the upper portion and the lower portion includes a plurality of legs, each leg being connected to the cowl upper or cowl lower at spaced-apart locations along the vehicle widthwise direction.

In yet another embodiment, a windshield support assembly includes a windshield extending in a vehicle widthwise direction, a cowl upper extending in the vehicle widthwise direction and comprising a windshield support section connected to the windshield, a cowl lower extending in the vehicle widthwise direction and comprising a cowl upper support section connected to the cowl upper and a dash support section connected to a dash, and a cowl brace comprising an upper portion comprising a plurality of upper legs connected to the cowl upper, a lower portion comprising a plurality of lower legs connected to the cowl lower and a continuous body portion connecting the upper portion and the lower portion wherein the cowl brace is configured to bend under an impact to the windshield such that the cowl upper moves toward the cowl lower.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein generally relate to cowl braces that are used to connect a cowl upper and a cowl lower of a windshield support assembly. The cowl braces may have a relatively discontinuous structure across their widths that provide multiple connection locations to the cowl upper and/or the cowl lower. The cowl braces may also provide a relatively enclosed support structure across the width of the vehicle that can be used to support a windshield of the vehicle and may provide predictable cowl brace deformation and windshield vibration limiting results. Various embodiments of the cowl braces will be described in more detail herein.

Figure 1:
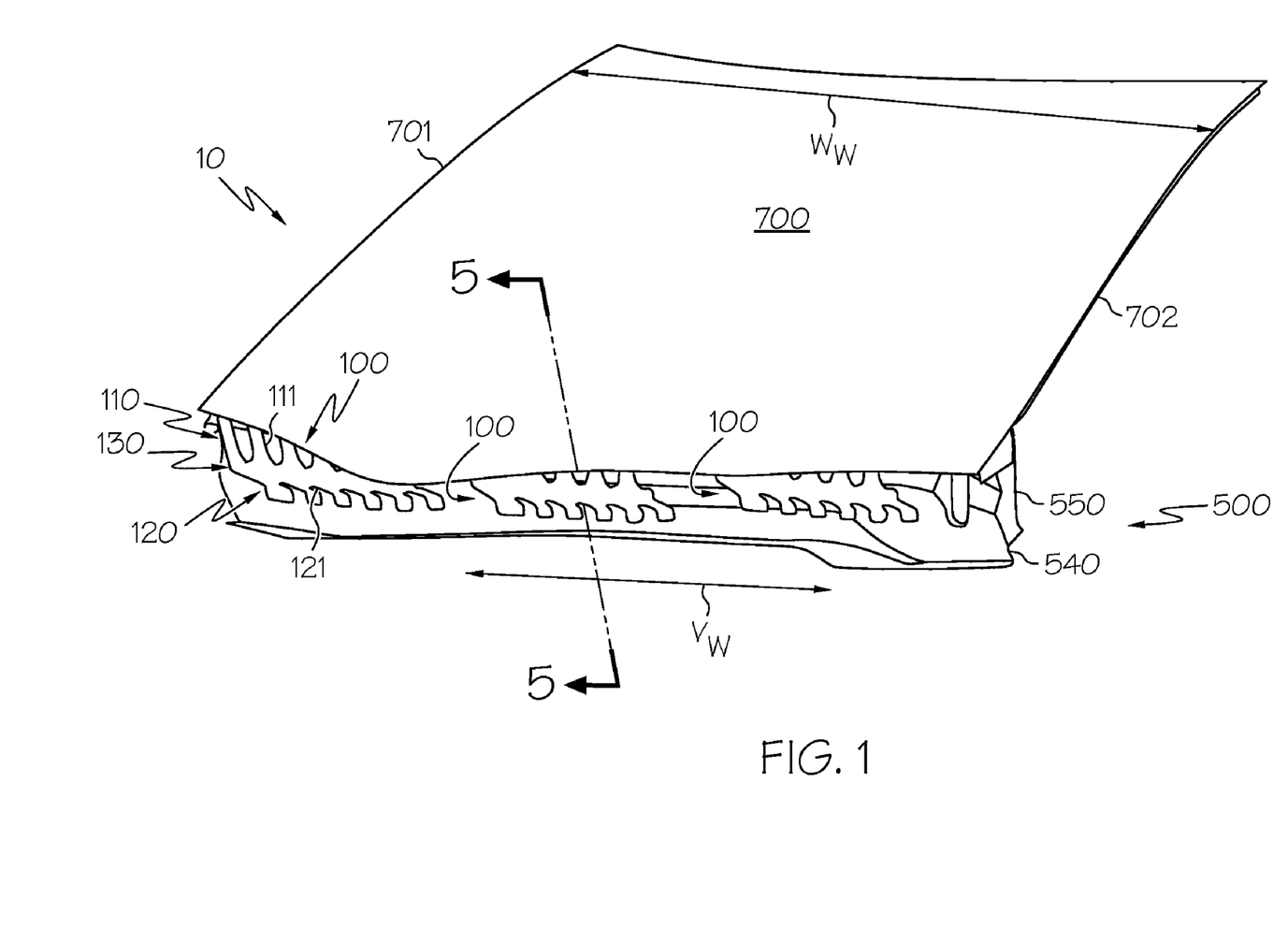
FIG. 1 depicts a windshield support assembly comprising a plurality of cowl braces according to one or more embodiments shown and described herein.

As seen in FIG. 1, a windshield support assembly 10 may generally comprise a windshield 700 supported by a cowl structure 500. The cowl structure 500 may be used to support a vehicle dashboard (not shown) and the windshield 700 in place on the vehicle. The cowl structure 500 may include a cowl upper 550 and a cowl lower 540 extending along the base of the windshield 700 in a vehicle widthwise direction $V_W$. The vehicle widthwise direction $V_W$ is the direction extending from the driver's side of the vehicle to the passenger's side of the vehicle such that the windshield has a windshield width $W_W$ in the same direction. The cowl braces 100 may generally include an upper portion 110 and a lower portion 120 that is connected to the upper portion 110 by a continuous body portion 130. The upper portion 110 may include a plurality of upper legs 111 that are spaced-apart from each other in the vehicle widthwise direction $V_W$. Likewise, the lower portion 120 may include a plurality of lower legs 121 that are also spaced-apart from each other in the vehicle widthwise direction $V_W$. The upper legs 111 of each cowl brace 100 may be connected to the cowl upper 550 and the lower legs 121 of each cowl brace 100 may be connected to the cowl lower 540 at multiple, spaced-apart locations along the vehicle widthwise direction $V_W$.

In the illustrated embodiment, three cowl braces 100 (e.g., cowl brace assembly) are used to connect the cowl upper 550 to the cowl lower 540. However, more or less than three cowl braces 100 may connect the cowl upper 550 to the cowl lower 540 in the windshield support assembly 10, the number of which may depend, at least in part, on the type of vehicle and the windshield support assembly 10 support requirements. The cowl braces 100 may be disposed in a variety of configurations along the windshield width $W_W$. For example, where the windshield support assembly 10 comprises three cowl braces 100, each being relatively identical to each other, the cowl braces 100 may be disposed such that a common distance separates each of the cowl braces 100 (as illustrated in FIG. 1). In one embodiment, a first cowl brace 100 may be substantially centered about the windshield width $W_W$. In such an embodiment, additional cowl braces 100 may be disposed closer to the edges of the windshield width $W_W$, or evenly distributed across the windshield width $W_W$. In another embodiment, the windshield support assembly 10 may comprise a single cowl brace 100 disposed at a centered or non-centered location along the windshield width $W_W$. Other configurations may depend in part on the number of cowl braces 100, the length of the windshield width $W_W$, the dimensions of each cowl brace 100 and/or the dimensions of the cowl structure 500.

Figure 2:
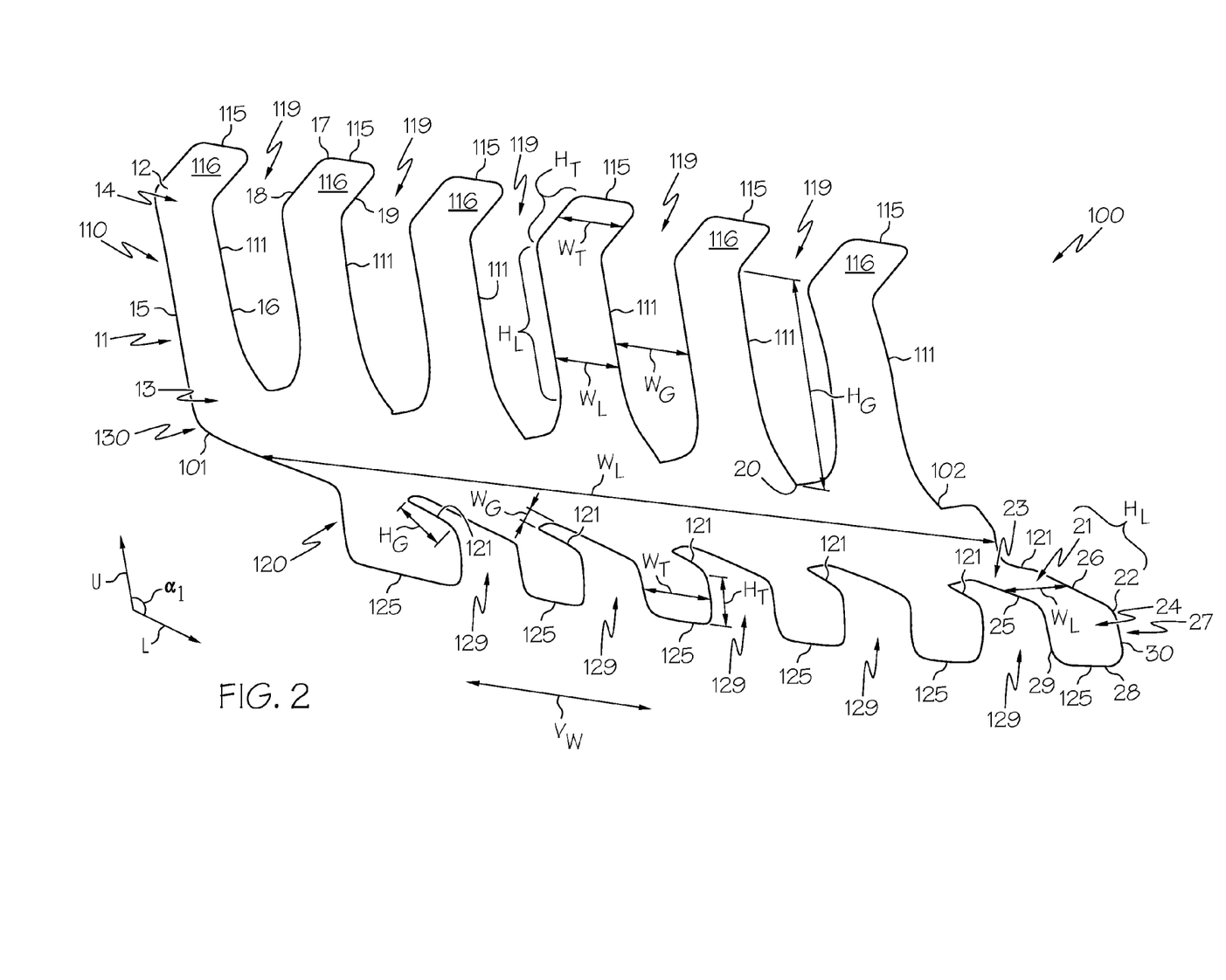
FIG. 2 depicts a cowl brace with a plurality of upper legs and lower legs according to one or more embodiments shown and described herein.

Referring now to FIG. 2, the exemplary embodiment of the cowl brace 100 is shown in isolation and comprises the upper portion 110 and the lower portion 120 connected by the continuous body portion 130. With reference to FIGS. 1 and 2, the upper portion 110 can comprise a plurality of upper legs 111 that extend in an upper direction U. The upper direction U is the direction extending from the continuous body portion 130 substantially towards the cowl upper of the windshield support assembly. Each of the upper legs 111 can comprise a leg portion 11 and an upper tab 115, the upper tab 115 being connected to the leg portion 11 by a bend 12. Each leg portion 11 includes a base portion 13, an apex portion 14 and sides 15 and 16 that extend in the upper direction U from the base portion 13 to the apex portion 14. Each upper leg 111 has a leg height $H_L$, (the length the upper leg 111 extends in the upper direction U) that is measured along the U direction from the base portion 13 to the apex portion 14, and a leg width $W_L$ (the length the upper leg 111 extends in the vehicle widthwise direction $V_W$) that is measured between sides 15 and 16 of the leg portion 11 as illustrated. The upper legs 111 of the upper portion 110 of the cowl brace 100 may comprise any width $W_L$ operable to allow connection between the cowl brace 100 and the cowl upper 550. The upper legs 111 may each comprise a uniform width $W_L$ or may alternatively vary in width $W_L$ based in part on the configuration of the windshield support assembly 10 (and more specifically the upper cowl 550). Each upper leg 111 can comprise a leg height $H_L$ that is uniform or varied across its leg width $W_L$. Likewise, each upper leg 111 can also comprise a leg width $W_L$ that is uniform or varied across the leg height $H_L$.

Each of the upper legs 111 may further comprise the upper tab 115 operable for connection to the cowl upper 550. The upper tabs 115 may comprise a flange-like extension extending from the leg portions 11 that allow for an upper tab connection surface 116 to contact a surface of the upper cowl 550 for connection. In one embodiment, the upper tab 115 may be located remote from the continuous body portion 130 at a distal end of the leg portion 11 (i.e., at the apex portion 14). Each upper tab 115 is connected to the leg portion 11 by the bend 12 and includes an end 17 and sides 18 and 19 extending from the end 17 to the bend 12. The upper tabs 115 may comprise a tab width $W_T$ (the length the upper tab 115 extends in the vehicle widthwise direction $V_W$) extending between the sides 18 and 19, and a tab height $H_T$ (the length the upper tab 115 extends away from the upper leg 111) extending from the bend 12 to the end 17. The tab width $W_T$ may be about the same as the leg width $W_L$ as illustrated, or alternatively may comprise a varying width $W_T$ such that the upper tab 115 tapers away from the leg segment 11. The upper tab 115 may then be secured to the cowl upper 550 through any type of connection such as welds, bolts, screws, adhesives or any alternative securement operable to fixedly connect the upper portion 110 of the cowl brace 100 to a cowl upper 550.

Still referring to FIG. 2, in one exemplary embodiment, the upper portion 110 of the cowl brace 100 may comprise the plurality of upper legs 111 disposed along the continuous body portion 130 at spaced-apart locations in the vehicle widthwise direction $V_W$. For example, as illustrated, the upper portion may comprise six spaced-apart upper legs 111. In another embodiment, the upper portion 110 may comprise less than or more than six upper legs 111. In yet another embodiment, the upper portion 110 may comprise a single upper leg 111 such that the upper portion 110 comprises one continuous piece. Furthermore, the plurality of upper legs 111 can extend in a common planar direction (where each of the plurality of upper legs 111 substantially extend along a single plane), or, in the alternative, each of the plurality of upper legs 111 may individually deviate from a common plane but still substantially extend in the upper direction U towards the cowl upper 550.

Each of the upper legs 111 of the upper portion 110 of the cowl brace 100 may be separated by upper leg gaps 119 in the vehicle widthwise direction $V_W$. The upper leg gaps 119 can comprise a gap height $H_G$ measured from a gap base 20 to the bend 12 in the upper direction U and a gap width $W_G$ measured between adjacent sides 18 and 19. The upper leg gaps 119 may comprise uniform gap heights $H_G$ and gap widths $W_G$ or they may comprise varying gap heights $H_G$ and gap widths $W_G$. For example, as in the illustrated embodiment, the gap width $W_G$ can gradually decrease toward the continuous body portion 130 (i.e., toward the gap base 20). The dimensions of the upper leg gaps 119 and the upper legs 111, may also vary with respect to one another. For example, in one embodiment, the leg width $W_L$ for each of the upper legs 111 and the gap width $W_G$ for each of the upper leg gaps 119 may be about the same. In another embodiment, the leg width $W_L$ for the upper legs 111 may each comprise a first common dimension and the gap width $W_G$ for the upper leg gaps 119 may each comprise a second common dimension greater than or less than the first common dimension. In yet another embodiment, the leg width $W_L$ and/or the leg height $H_L$ for each upper leg 111 as well as the gap width $W_G$ and/or the gap height $H_G$ for each of the upper leg gaps 119 can vary based on its location between a first end 101 of the cowl brace 100 and a second end 102 of the cowl brace 100 in the vehicle widthwise direction $V_W$. For example, in one embodiment, the upper legs 111 disposed at the center of the cowl brace 100 (or half way between the first end 101 and second end 102) may have a greater leg width $W_L$ and/or leg height $H_L$ than upper legs 111 disposed more proximate to the first end 101 or second end 102 of the cowl brace 100. In yet another embodiment, such as where the cowl brace 100 may be positioned in a windshield support assembly substantially towards one side of the vehicle (i.e. not about the center of the windshield width $W_W$), the leg widths $W_L$ of the individual upper legs 111 and/or the gap widths $W_G$ of the upper leg gaps 119 may decrease and/or increase as they are positioned towards the side of the vehicle.

As seen in FIGS. 1 and 2, the lower portion 120 of the cowl brace 100 may similarly comprise a plurality of lower legs 121 extending from the continuous body portion 130 in a lower direction L. The lower direction L is the direction extending from the continuous body portion 130 substantially towards the cowl lower 540 of a windshield support assembly 10. The lower direction L will therefore form a first angle $\alpha_1$ with the upper direction U. Depending in part on the configuration of the windshield support assembly 10, the lower direction L may be perpendicular to, opposite to, or deviate by any other first angle $\alpha_1$ from the upper direction U.

Each lower leg 121 may comprise a leg portion 21 and a lower tab 125, the lower tab 125 being connected to the leg portion 21 by a bend 22. Similar to the upper legs 111, each leg portion 21 includes a base portion 23, an apex portion 24 and sides 25 and 26 that extend generally in the lower direction L from the base portion 23 to the apex portion 24. Each lower leg 121 has a leg height $H_L$ that is measured along the L direction from the base portion 23 to the apex portion 24 and a leg width $W_L$ that is measured between the sides 25 and 26 of the leg portion 21. The widths $W_L$ and the heights $H_L$ of the lower legs 121 may vary (or not) in a fashion the same as or similar to those described above with regard to the upper legs 111.

Each lower leg 121 may further comprise the lower tab 125 operable for connection to the cowl lower 540. Similar to the upper tabs 115, the lower tabs 125 may comprise a flange-like extension extending from the leg portions 21 that allow for a lower tab connection surface 27 to contact a surface of the cowl lower 540. The lower tabs 125 may be located remote from the continuous body portion 130 at a distal end of the leg portions 21. Each lower tab 125 is connected to the leg portion 21 by the bend 22 and includes an end 28 and sides 29 and 30 extending from the end 28 to the bend 22. The lower tabs 125 may comprise the tab width $W_T$ extending between the sides 29 and 30, and the tab height $H_T$ extending from the bend 22 to the end 28. The tab widths $W_T$ and the tab heights $H_T$ may vary (or not) in a fashion similar to or the same as those described above with regard to the upper tabs 115.

The lower legs 121 may be separated by lower leg gaps 129 in the vehicle widthwise direction $V_W$. Similar to the upper leg gaps 119, the lower leg gaps 129 can comprise a gap height $H_G$ measured from a gap base 31 to the bend 22 in the L direction and a gap width $W_G$ measured between adjacent sides 29 and 30. The gap heights $H_G$ and the gap widths $W_G$ and the relationships between the lower leg gaps 129 and the lower legs 121 can vary (or not) in a fashion similar to or the same as those described above with regard to the upper leg gaps 119. Similar to the upper portion 110, the lower portion 120 may comprise any number of lower legs 121 with or without lower tabs 125 and/or lower leg gaps 129 having any length and width operable to allow for connection between the lower portion 120 and the cowl lower 540 as appreciated herein.

The continuous body portion 130 may thereby connect the upper portion 110 to the lower portion 120 of the cowl brace 100. The continuous body portion 130 may specifically be configured to allow for connection between the upper legs 111 extending in the upper direction U and the lower legs 121 extending in the lower direction L and extend in the vehicle widthwise direction $V_W$ from a first end 101 to a second end 102 of the cowl brace 100. A width $W_C$ of the continuous body portion 130 extends between the first end 101 to the second end 102 generally in the vehicle widthwise direction $V_W$. The width $W_C$ may be less than the individual or combined widths $W_L$ of the upper legs 111 and/or the lower legs 121. Furthermore, the width $W_C$ of the continuous body portion 130 may be greater than, less than or equal to the length of the upper portion 110 in the vehicle widthwise direction $V_W$ (measured between outmost sides 15 and 16 of the outermost upper legs 111) and/or the length of the lower portion 120 in the vehicle widthwise direction $V_W$ (measured between outermost sides 25 and 26 of the outermost lower legs 121). In one embodiment, as illustrated in FIGS. 1 and 2, the continuous body portion 130 may comprise a continuous curve or bend line connecting the upper portion 110 and lower portion 120.

Figure 3:
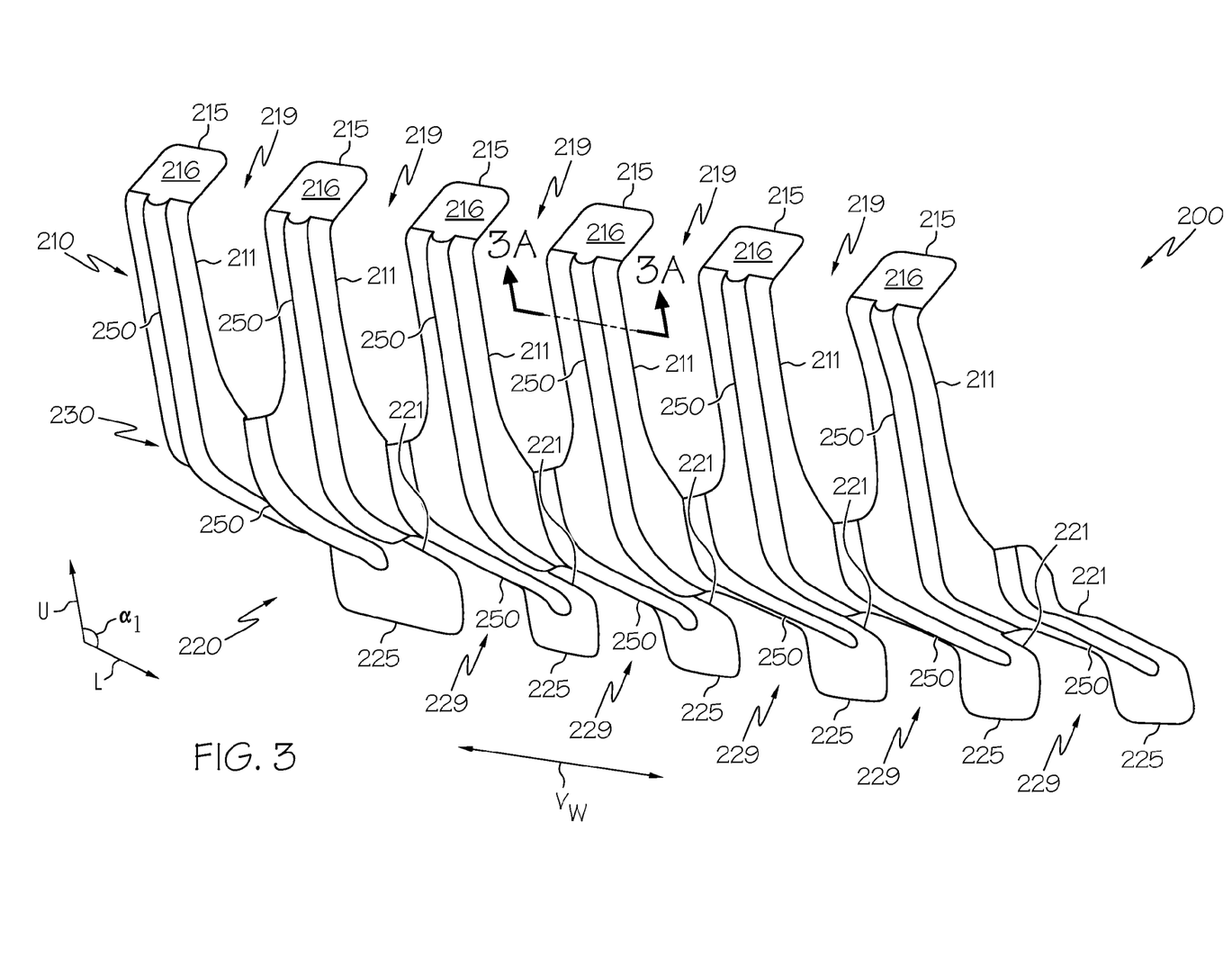
FIG. 3 depicts another cowl brace with a plurality of upper legs and lower legs having beads according to one or more embodiments shown and described herein.

Referring now to FIG. 3, in another embodiment, a cowl brace 200 may include one or more of the features described above with regard to the cowl brace 100 and may further comprise a plurality of beads 250 to provide additional rigidity and potentially reduce noise and vibration in the windshield support assembly. The beads 250 may be elongated protrusions disposed along the upper portion 210, lower portion 220 and/or the continuous body portion 230 in both the upper U and/or lower L directions. For example, as illustrated, the upper portion 210 of the cowl brace 200 may comprise a plurality of upper legs 211 extending in the upper direction U and separated by upper leg gaps 219. The upper legs 211 may further comprise upper tabs 215 having upper tab connection surfaces 216 for connection to a cowl upper. The lower portion 220 of the cowl brace 200 may comprise a plurality of lower legs 221 extending in a lower direction L and separated by lower leg gaps 229. The lower legs 221 may further comprise lower tabs 225 for connection to a cowl lower. The upper legs 211, the lower legs 221, the upper leg gaps 219 and the lower leg gaps 229 may generally have many of the features including heights $H_L$, $H_G$ and widths $W_L$ and $W_G$ as those described above with regard to cowl brace 100.

Figure 3A:
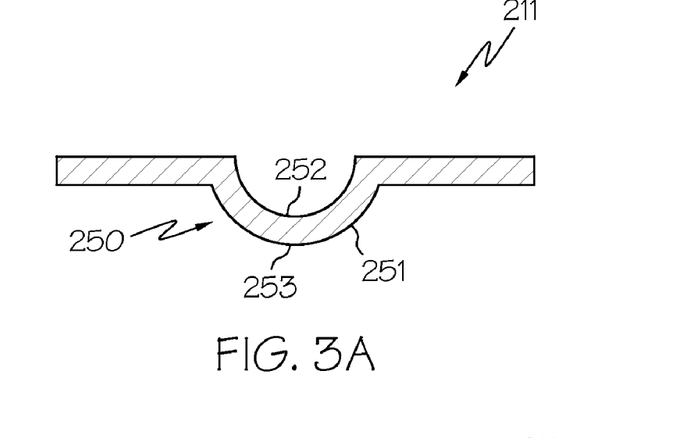
FIG. 3A is a sectional view along lines A-A of FIG. 3 illustrating an exemplary bead according to one or more embodiments shown and described herein.
Figure 3B:
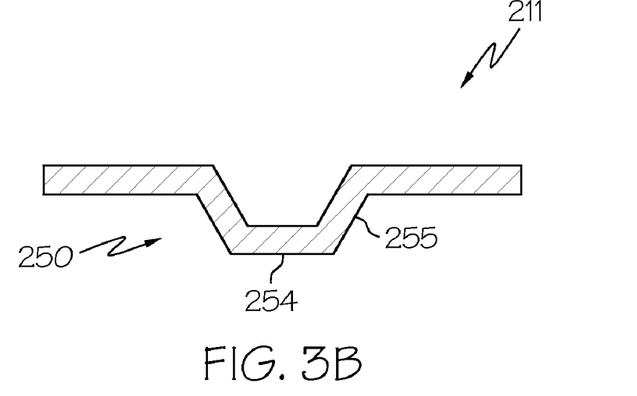
FIG. 3B is a sectional view of another bead structure according to one or more embodiments shown and described herein.
Figure 3C:
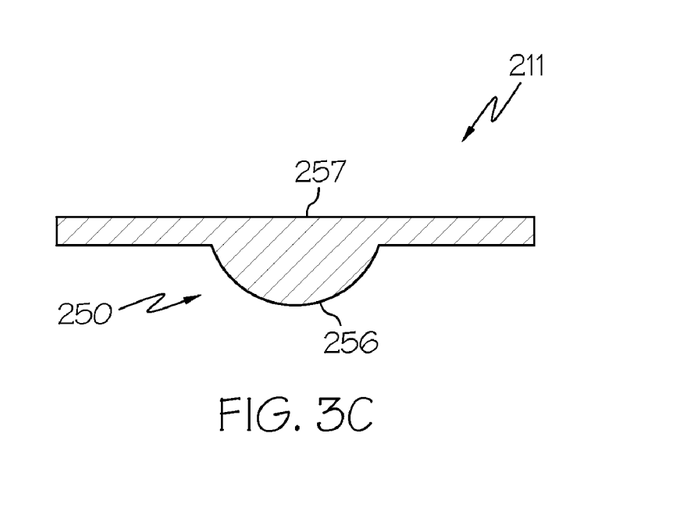
FIG. 3C is a sectional view of another bead structure according to one or more embodiments shown and described herein.

Referring also to FIG. 3A, one or more beads 250 may be disposed along the upper portion 210, lower portion 220 and/or continuous body portion 230. The beads 250 may comprise any elongated protrusion disposed along the height $H_L$ of the upper legs 211 and/or lower legs 221, for example, to provide additional rigidity (e.g., as compared to cowl brace 100 without the beads 250). In one embodiment, such as the embodiment of FIG. 3A, the beads 250 may comprise an arcuate protrusion 251 with a semi-circular cross section having both a concave face 252 and a convex face 253. Referring to FIG. 3B, in another embodiment, the beads 250 may comprise a protrusion 254 having one or more straight sides 255, e.g., with a pointed cross section or a plateau. Referring to FIG. 3C, in yet another embodiment, the beads 250 may comprise a protrusion 256 having a flat opposite side 257 (i.e., the protrusion may extend outwardly from only one side of the cowl brace). The beads 250 may be formed of material forming the legs 111 and 121 (e.g., by bending or otherwise deforming the material) and/or of a different material (by welding or otherwise connecting another material to the legs 111 and/or 121). The beads 250 may further extend for any height (continuously and/or discontinuously) along the upper legs 211 and/or lower legs 221 as operable to provide additional rigidity to the cowl brace 200. For example, in one embodiment, as illustrated in FIG. 2, the beads 250 can extend for the entire height $H_L$ of the upper legs 211 and lower legs 221 (excluding the upper tabs 215 and lower tabs 225) and further extend across the continuous body portion 230 in a continuous fashion. In another embodiment, the beads 250 may extend across only a portion of the height $H_L$ of the upper legs 211 and/or lower legs 221. In yet another embodiment, only some or one of the upper legs 211 and/or lower legs 221 may comprise a bead 250. For example, beads 250 may be disposed on only every other upper leg 211 and/or lower leg 221, only on upper legs 211 or only on lower legs 221. The beads 250 may thereby provide additional rigidity to the cowl brace 200 such that the cowl brace 200 is more resistant to bending and/or vibrating when connected to the cowl upper and cowl lower of a windshield support assembly.

Figure 4:
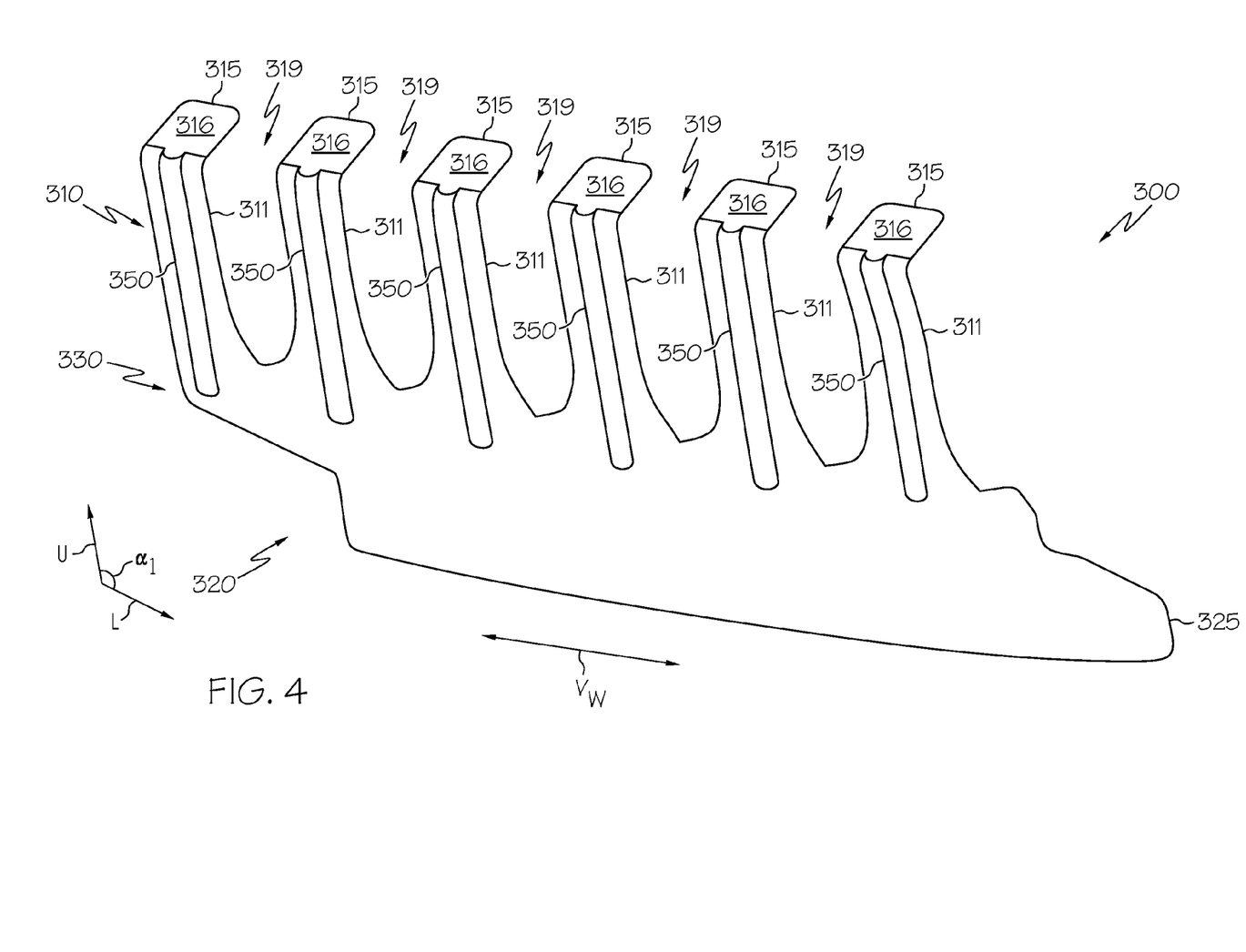
FIG. 4 depicts yet another cowl brace with a plurality of upper legs having beads according to one or more embodiments shown and described herein.

Referring now to FIG. 4, in yet another exemplary embodiment, a cowl brace 300 may comprise an upper portion 310 with a different configuration than its lower portion 320. For example, as illustrated, the cowl brace 300 can comprise an upper portion 310 and a lower portion 320 wherein the lower portion 320 comprises a single continuous piece with no gaps. Specifically, the upper portion 310 may comprise a plurality of upper legs 311 having upper tabs 315 with upper tab connection surfaces 316. The upper legs 311 may further comprise beads 350 that extend about the height of the upper legs 311 to the continuous body portion 330. The lower portion 320 may alternatively comprise a single lower leg 321 having a lower tab 325 and not comprising any beads 350. In alternative embodiments, the upper portion 310 and lower portion 320 may independently comprise any other various embodiments having various dimensions or geometries such that it can connect the cowl upper to the cowl lower of a cowl structure.

Figure 5:
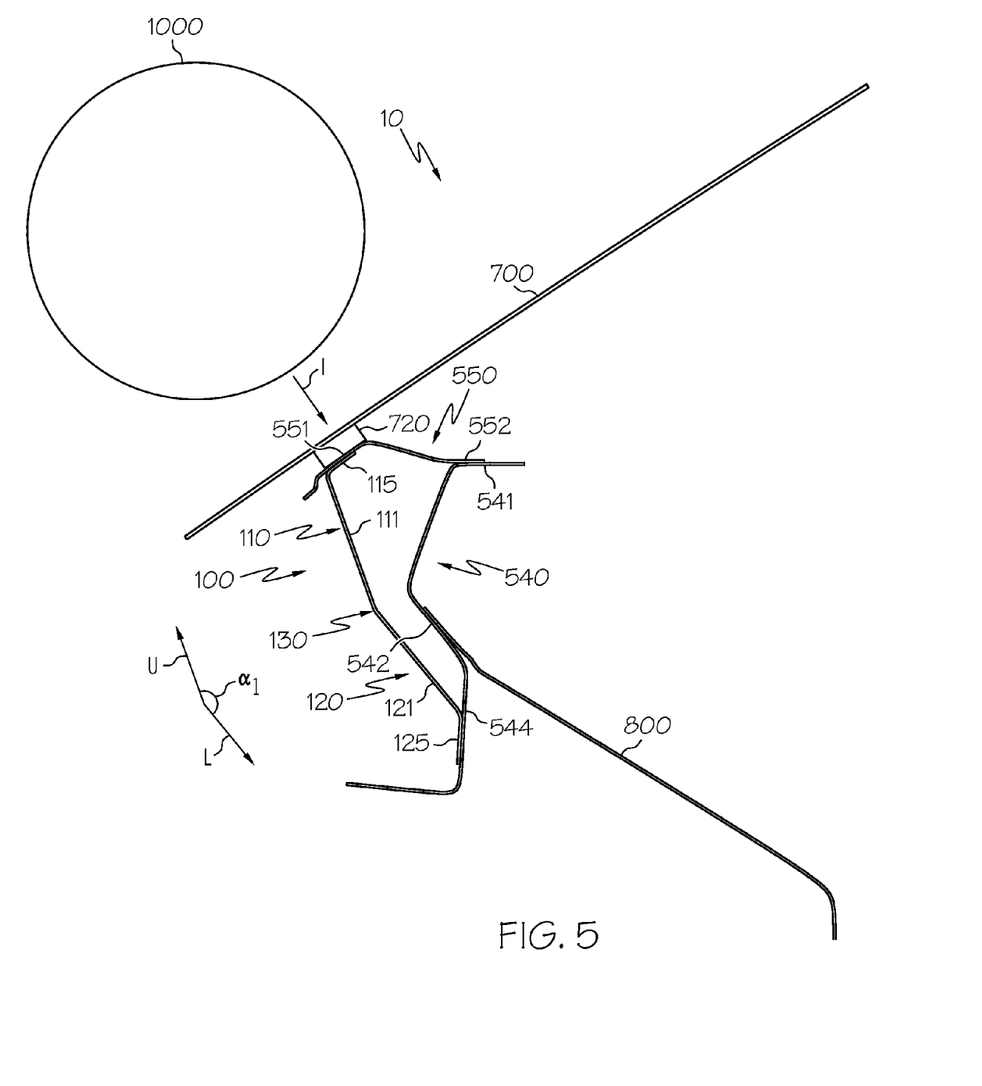
FIG. 5 depicts a cross section of a windshield support assembly with an object having an impact trajectory.
Figure 6:
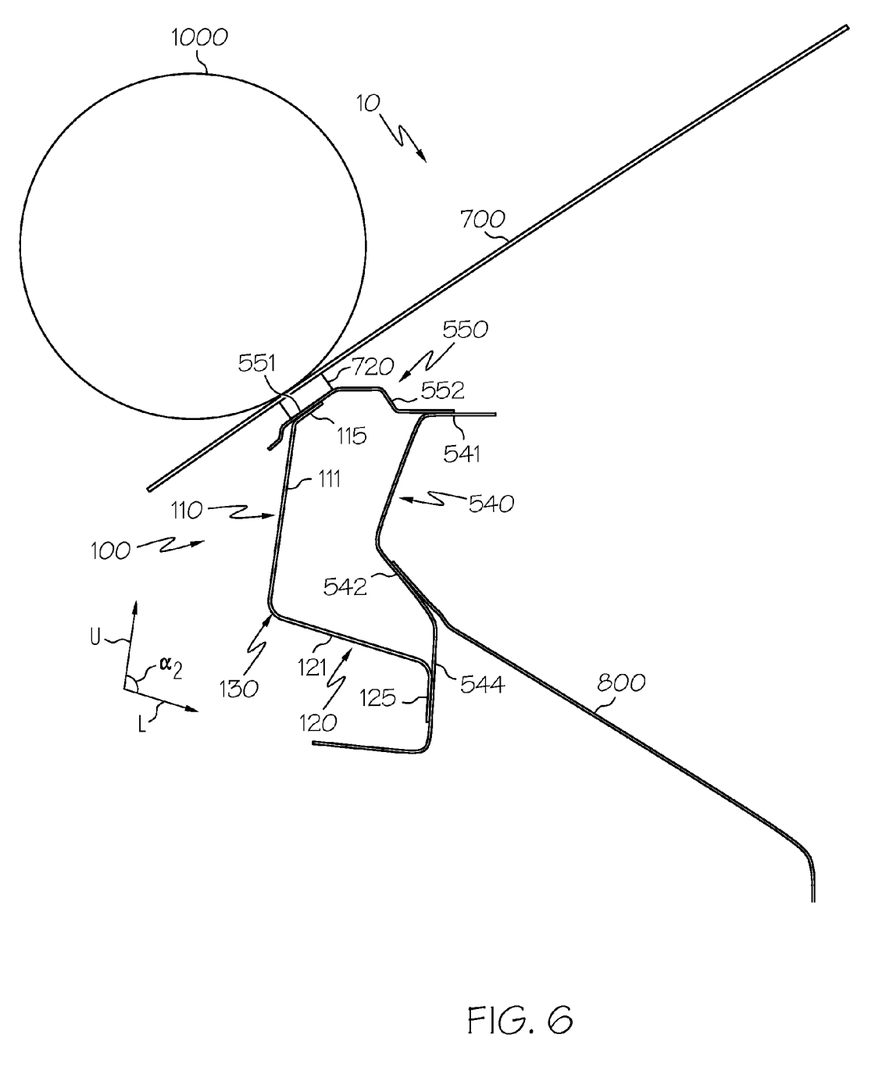
FIG. 6 depicts a cross section of a windshield support assembly after an object has impacted the windshield according to one or more embodiments shown and described herein.

Referring now to FIGS. 5 and 6, the windshield support assembly 10 of FIG. 1 is illustrated in cross section. The windshield support assembly 10 comprises the windshield 700 supported by the cowl upper 550. In one exemplary embodiment, the windshield 700 may be secured to a windshield support section 551 on the cowl upper 550 via a windshield support 720. The windshield support 720 may comprise any material operable to fixedly secure the windshield 700 to the cowl upper 550 such as adhesive, foam or bolts. In one embodiment, the windshield support 720 may further provide vibration dampening between the windshield 700 and the overall windshield support assembly 10 by partially absorbing external forces applied about the windshield 700. A cowl lower support section 552 of the cowl upper 550 may also be secured to the cowl upper support section 541 of the cowl lower 540. The connection between the cowl upper 550 and the cowl lower 540 (via the cowl lower support section 552 and the cowl upper support section 541) may be achieved through welds, bolts, screws or any other connection type that fixedly secures the two elements together. The cowl lower 540 may then further connect with the dash 800 about a dash support section 542. It should be noted that while the cowl upper 550, cowl lower 540 and dash 800 are all illustrated in FIGS. 5 and 6 as having an exemplary configuration, all elements may comprise additional or fewer segments than illustrated and it should be appreciated that the elements may thereby embody alternative configurations.

The cowl brace 100 (and/or cowl brace 200 and 300) may connect to the cowl upper 550 and cowl lower 540 to provide additional support to the windshield support assembly 10. Specifically, upper tabs 115 of the cowl brace 100 may connect to the cowl upper 550 about its windshield support section 551. Likewise, lower tabs 125 of the cowl brace 100 may connect to the cowl lower 540 about its cowl brace support section 544. The connection between the cowl brace 100 and the cowl upper 550 and the connection between the cowl brace 100 and the cowl lower 540 may be achieved through welds, bolts, screws or any other connection type that fixedly secures the elements together. The addition of the cowl brace 100 to the windshield support assembly 10 may thereby provide additional structural support between the cowl upper 550 and the cowl lower 540. Specifically, the upper portion 110 (and the upper legs 111) of the of the cowl brace 100 and the lower portion 120 (and the lower legs 121) of the cowl brace 100 connected by the continuous body portion 130 can provide support against noise, vibration and impacting forces.

The overall configuration of the cowl brace 100 may also allow it to bend or otherwise deform in a predictable fashion when an external force of sufficient magnitude is applied to the upper portion 110 relative the lower portion 120, such as when an impact force is applied about the windshield 700 as will become appreciated herein. For example, in one embodiment, the cowl brace 100 may be configured such that it has a specific "bend line," or other line of weakness about which the cowl brace is prone to deform. The bend line may extend in the vehicle widthwise direction $V_W$ along the continuous body portion 130, the upper portion 110 and/or the lower portion 120. The bend line may be influenced by the thickness of the cowl brace 100 in different areas, the dimensions of the cowl brace 100 (such as the height or number of upper legs 111 or lower legs 121), or any other features of the cowl brace 100. Furthermore, the overall configuration of the cowl brace 100 may be adjusted such that the cowl brace 100 is rigid enough to limit or prevent excess noise and/or vibration in a windshield support assembly 10 while still being operable to partially absorb the force of an impacting object through bending or deforming.

In one exemplary operation as seen in FIGS. 5 and 6, an object 1000 may strike the windshield 700 at an impact trajectory I. As illustrated in FIG. 5, before the impact occurs, the cowl brace 100 possesses a first angle $\alpha_1$ between the upper portion 110 and the lower portion 120. As seen in FIG. 6, after the object 1000 strikes the windshield 700, the force may be passed through the windshield support assembly 10 and partially absorbed by the cowl brace 100 causing it to deform into a new position. For example, the upper portion 110, comprising one or more upper legs 111, can bend towards the lower portion 120, comprising one or more lower legs 120, to form a second angle $\alpha_2$ between the two that is different than the first angle $\alpha_1$ prior to impact. In one embodiment, as illustrated in FIG. 6, the cowl brace 100 may bend along the continuous body portion 130 such that the upper portion 110 and lower portion 120 move towards each other. In other embodiments, the cowl brace 100 may bend about other locations such as the upper portion 110 and/or the lower portion 120. In yet another embodiment, the cowl brace 100 may posses more than one bend line such that the cowl brace 100 bends at multiple locations upon a sufficient force from an impacting object 1000. The cowl brace 100 may thereby at least partially absorb the impact force from the object 1000 such that the acceleration of the object 1000 (or how quickly the object is stopped) is decreased which can provide a softer impact to the object 1000 by reducing the amount of force the object 1000 absorbs.

It should now be appreciated that cowl braces may be provided in windshield assemblies to provide additional support. The cowl braces may be configured such that the support they provide is rigid enough to limit noise and/or vibration while still being operable to bend or deform under an impacting force to at least partially absorb the impact. The cowl braces described herein may be formed of any suitable material or combination of materials such as metals (e.g., steel, aluminum, etc.) and/or plastics and may be formed by any suitable process or combination of processes such as machining, stamping, bending, etc.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A windshield support assembly comprising:
   a cowl upper that extends in a vehicle widthwise direction and is configured to connect to a windshield;
   a cowl lower that extends in the vehicle widthwise direction and is configured to connect to the cowl upper; and
   a plurality of cowl braces connected to the cowl upper and the cowl lower, wherein the plurality of cowl braces are spaced-apart from each other in the vehicle widthwise direction and each cowl brace of the plurality of cowl braces comprises an upper portion, a lower portion and a continuous body portion connecting the upper portion and the lower portion wherein at least one of the upper portion and the lower portion includes a plurality of legs, each leg being connected to the cowl upper or the cowl lower at spaced-apart locations along the vehicle widthwise direction.

2. The windshield support assembly of claim 1, wherein the plurality of cowl braces comprises at least one cowl brace comprising a bend line extending in the vehicle widthwise direction.

3. The windshield support assembly of claim 1, wherein the plurality of legs comprises a pair of adjacent legs separated by a gap having a distance and a height, wherein the distance of the gap varies along at least a portion of the height of the gap.

4. The windshield support assembly of claim 1 wherein the plurality of cowl braces comprises at least three cowl braces.

5. The windshield support assembly of claim 1 wherein the plurality of legs comprise beads.

6. The windshield support assembly of claim 5 wherein the beads comprise protrusions extending outwardly from the plurality of legs.

7. The windshield support assembly of claim 6 wherein the beads comprise at least one bead extending continuously from the upper portion of the cowl brace and onto the continuous body portion of the cowl brace.

8. A windshield support assembly, comprising:
   a windshield extending in a vehicle widthwise direction;
   a cowl upper extending in the vehicle widthwise direction and comprising a windshield support section connected to the windshield;
   a cowl lower extending in the vehicle widthwise direction and comprising a cowl upper support section connected to the cowl upper and a dash support section connected to a dash; and
   a cowl brace comprising an upper portion comprising a plurality of upper legs connected to the cowl upper, a lower portion comprising a plurality of lower legs connected to the cowl lower and a continuous body portion connecting the upper portion and the lower portion wherein the cowl brace is configured to bend under an impact to the windshield such that the cowl upper moves toward the cowl lower.

9. The windshield support assembly of claim 8 further comprising a plurality of cowl braces connected to the cowl upper and the cowl lower.

10. The windshield support assembly of claim 8 wherein at least one of the plurality of upper legs and the plurality of lower legs comprises a pair of adjacent legs separated by a gap having a distance and a height, wherein the distance of the gap varies along at least a portion of the height of the gap.

11. The windshield support assembly of claim 10 wherein the at least one of the plurality of upper legs and the plurality of lower legs comprises a first leg having a width and a height, wherein the width varies along at least a portion of the height of the first leg.

12. The windshield support assembly of claim 8 wherein the plurality of upper legs extend in an upward direction and the plurality of lower legs extend in a lower direction, the upper direction being at an angle of less than 180 degrees to the lower direction.

13. A windshield support assembly comprising:
    a cowl upper that extends in a vehicle widthwise direction and is configured to connect to a windshield;
    a cowl lower that extends in the vehicle widthwise direction and is configured to connect to the cowl upper; and
    a cowl brace that comprises an upper portion, a lower portion and a continuous body portion connecting the upper portion and the lower portion wherein at least one of the upper portion and the lower portion includes a plurality of legs, each leg of the plurality of legs being connected to the cowl upper or the cowl lower at spaced-apart locations along the vehicle widthwise direction, wherein the plurality of legs comprises beads.

14. The windshield support assembly of claim 13, wherein the beads comprise at least one bead comprising an elongated protrusion.

15. The windshield support assembly of claim 13, wherein the beads comprise protrusions extending outwardly from the plurality of legs.

16. The windshield support assembly of claim 13, wherein the beads comprise at least one bead extending continuously from the upper portion or the lower portion and onto the continuous body portion of the cowl brace.

17. The windshield support assembly of claim 13, wherein the cowl brace comprises a bend line extending in the vehicle widthwise direction.

18. The windshield support assembly of claim 17, wherein the bend line extends along the continuous body portion of the cowl brace.

19. The windshield support assembly of claim 13, wherein the lower portion of the cowl brace comprises a plurality of lower legs extending in a lower direction, the plurality of lower legs being spaced-apart from each other in the vehicle widthwise direction for connection to the cowl lower, wherein the plurality of lower legs comprises at least one lower leg comprising a lower tab distal the continuous body portion.

20. The windshield support assembly of claim 13, wherein the upper portion of the cowl brace comprises a plurality of upper legs extending in an upper direction, the plurality of upper legs being spaced-apart from each other in the vehicle widthwise direction for connection to the cowl upper, wherein the plurality of upper legs comprises at least one upper leg comprising an upper tab distal the continuous body portion.

* * * * *